United States Patent
Kramer et al.

(10) Patent No.: US 12,166,880 B2
(45) Date of Patent: Dec. 10, 2024

(54) PARTITIONING A BLOCKCHAIN NETWORK

(71) Applicant: nChain Licensing AG, Zug (CH)

(72) Inventors: Dean Kramer, London (GB); Martin Sewell, London (GB); Bassem Ammar, Lancaster (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/221,325

(22) Filed: Jul. 12, 2023

(65) Prior Publication Data

US 2024/0048378 A1 Feb. 8, 2024

Related U.S. Application Data

(63) Continuation of application No. 17/051,070, filed as application No. PCT/IB2019/053381 on Apr. 24, 2019, now Pat. No. 11,743,045.

(30) Foreign Application Priority Data

| Apr. 27, 2018 | (GB) | .................................. | 1086907 |
| Apr. 27, 2018 | (GB) | .................................. | 1806909 |
| Apr. 27, 2018 | (GB) | .................................. | 1806911 |
| Apr. 27, 2018 | (GB) | .................................. | 1806914 |
| Apr. 27, 2018 | (GB) | .................................. | 1806930 |

(51) Int. Cl.
*G06Q 20/06* (2012.01)
*G06F 9/38* (2018.01)
(Continued)

(52) U.S. Cl.
CPC .............. *H04L 9/32* (2013.01); *G06F 9/3836* (2013.01); *G06F 16/2246* (2019.01);
(Continued)

(58) Field of Classification Search
CPC .... G06Q 20/00–425; G06F 16/00–986; H04L 9/00–38; H04L 2209/00–88
See application file for complete search history.

(56) References Cited

U.S. PATENT DOCUMENTS

| 7,702,614 | B1 | 4/2010 | Shah et al. |
| 10,250,708 | B1 * | 4/2019 | Carver ................ H04L 67/1042 |

(Continued)

FOREIGN PATENT DOCUMENTS

| CN | 107766540 A | 3/2018 |
| CN | 108399572 A | 8/2018 |

(Continued)

OTHER PUBLICATIONS

Andreas M. Antonopoulos, Mastering Bitcoin, 2014, published by O'Reilly Media, Inc., pertinent pages: pp. 111-134 (Year: 2014).*

(Continued)

*Primary Examiner* — Chenyuh Kuo
(74) *Attorney, Agent, or Firm* — Davis Wright Tremaine LLP

(57) ABSTRACT

A computer-implemented method of validating a blockchain transaction is disclosed. The method comprises requesting at least one UTXO referenced by at least one respective input of the transaction from a member node of at least one shard comprising at least one UTXO, obtaining validity data of at least one UTXO from at least one node, and performing a validation check on at least one input using the validity data.

5 Claims, 12 Drawing Sheets

(51) Int. Cl.

| | |
|---|---|
| *G06F 16/22* | (2019.01) |
| *G06F 16/23* | (2019.01) |
| *G06F 16/27* | (2019.01) |
| *G06F 16/901* | (2019.01) |
| *G06Q 20/22* | (2012.01) |
| *G06Q 20/36* | (2012.01) |
| *G06Q 20/38* | (2012.01) |
| *H04L 9/06* | (2006.01) |
| *H04L 9/32* | (2006.01) |
| *H04L 9/00* | (2022.01) |

(52) U.S. Cl.
CPC ........ *G06F 16/2379* (2019.01); *G06F 16/278* (2019.01); *G06F 16/9027* (2019.01); *G06Q 20/065* (2013.01); *G06Q 20/0658* (2013.01); *G06Q 20/223* (2013.01); *G06Q 20/3674* (2013.01); *G06Q 20/3678* (2013.01); *G06Q 20/3827* (2013.01); *H04L 9/0618* (2013.01); *H04L 9/0643* (2013.01); *H04L 9/3239* (2013.01); *H04L 9/50* (2022.05); *H04L 2209/56* (2013.01)

(56) References Cited

U.S. PATENT DOCUMENTS

| | | | | |
|---|---|---|---|---|
| 10,396,997 | B2* | 8/2019 | Brady | H04L 9/3247 |
| 10,491,378 | B2 | 11/2019 | Binning et al. | |
| 10,616,324 | B1* | 4/2020 | Kaddoura | H04L 69/329 |
| 10,740,733 | B2* | 8/2020 | Moir | G06Q 20/3825 |
| 10,826,705 | B2 | 11/2020 | Suen et al. | |
| 2009/0234878 | A1 | 9/2009 | Herz et al. | |
| 2011/0029376 | A1 | 2/2011 | Mills et al. | |
| 2015/0294308 | A1 | 10/2015 | Pauker et al. | |
| 2016/0224951 | A1 | 8/2016 | Hoffberg | |
| 2017/0048235 | A1 | 2/2017 | Lohe et al. | |
| 2017/0116693 | A1 | 4/2017 | Rae et al. | |
| 2017/0250972 | A1 | 8/2017 | Ronda et al. | |
| 2017/0293669 | A1 | 10/2017 | Madhavan et al. | |
| 2017/0295023 | A1 | 10/2017 | Madhavan et al. | |
| 2018/0019867 | A1 | 1/2018 | Davis | |
| 2018/0039667 | A1 | 2/2018 | Pierce et al. | |
| 2018/0049043 | A1 | 2/2018 | Hoffberg | |
| 2018/0145836 | A1 | 5/2018 | Saur et al. | |
| 2018/0189312 | A1 | 7/2018 | Alas et al. | |
| 2018/0336552 | A1 | 11/2018 | Bohli et al. | |
| 2018/0341930 | A1 | 11/2018 | Moir et al. | |
| 2019/0140935 | A1 | 5/2019 | Kikinis | |
| 2019/0149325 | A1 | 5/2019 | Garagiola et al. | |
| 2019/0163672 | A1 | 5/2019 | Shmueli | |
| 2019/0182313 | A1 | 6/2019 | Yoo et al. | |
| 2019/0272337 | A1 | 9/2019 | Stewart et al. | |
| 2019/0332608 | A1 | 10/2019 | Qiu | |
| 2020/0162264 | A1 | 5/2020 | Zamani et al. | |

FOREIGN PATENT DOCUMENTS

| | | |
|---|---|---|
| CN | 108596613 A | 9/2018 |
| CN | 108769264 A | 11/2018 |
| CN | 108900321 A | 11/2018 |
| CN | 108920723 A | 11/2018 |
| JP | 2009000708 A | 1/2009 |
| WO | 2018050222 A1 | 3/2018 |
| WO | 2018217804 A1 | 11/2018 |

OTHER PUBLICATIONS

Pedro Franco, Understanding Bitcoin, 2015, published by John Wiley & Sons Ltd., pertinent pages: pp. 77-92 (Year: 2015).*
Kokoris-Kogias et al., "OmniLedger: A Secure, Scale-Out, Decentralized Ledger via Sharding", 2018, IEEE computer society (Year: 2018).*
International Search Report and Written Opinion mailed Jul. 30, 2019, Patent Application No. PCT/IB2019/053378, 10 pages.
UK IPO Search Report mailed Oct. 23, 2018, Patent Application No. GB1806907.0, 7 pages.
Anonymous, "Distributed Hash Tables and Consistent Hashing," CloudFundoo, https://cloudfundoo.wordpress.com/2012/05/28/distributed-hash-tables-and-consistent-hashing, May 28, 2012, 7 pages.
Antonopoulos, "Mastering Bitcoin—Unlocking Digital Cryptocurrencies," O'Reilly Media, Inc., Dec. 20, 2014, 282 pages.
Basescu et al., "Poster: Low-latency Blockchain Consensus", Nov. 14, 2017, 2 pages.
Danda et al., "Why Aren't We as a Community Talking About Sharding As a Scaling Solution?," retrieved from https://www.reddit.com/r/Bitcoin/comments/3u1m36/why_arent_we_as_a_community_talking_about/cxbamhn/, Nov. 23. 2015, 24 pages.
Danezis et al., "Centrally Banked Cryptocurrencies" NDSS, Feb. 2016, San Diego, CA, Internet Society, 14 pages.
Dang et al., "Towards Scaling Blockchain Systems via Sharding," National University of Singapore, Mar. 12, 2019, 16 pages.
Delgado-Segura, et al. "Analysis of the Bitcoin UTXO Set", Lecture Notes in Computer Science book series LNSC, vol. 10958, Feb. 2019, 15 pages.
Eyeofpython et al., "Does CTOR (Canonical Transaction Ordering) Help Sharding? I had a Closer Look," Reddit, Sep. 20, 2018 [retrieved Mar. 28, 2022], https://www.reddit.com/r/btc/comments/9hfouo/does_ctor_canonical_transaction_ordering_help/, 5 pages.
Franco, "Understanding Bitcoin: Cryptography, Engineering and Economics," Wiley, ISBN: 978-1-119-01916-9, Oct. 2014, 144 pages.
Frey et al., "Bringing Secure Bitcoin Transactions to Your Smartphone," Hal Open Science, Nov. 3, 2016, 7 pages.
Harrison, "Next Generation Databases," Apress, 2015, 244 pages.
Heilman et al., "TumbleBit: An Untrusted Tumbler for Bitcoin-Compatible Anonymous Payments," International Association for Cryptologic Research, Jun. 3, 2016, 14 pages.
Hughes, "Radix—Tempo," Sep. 25, 2017, 15 pages.
International Search Report and Written Opinion mailed Jul. 30, 2019, Patent Application No. PCT/IB2019/053382, 11 pages.
International Search Report and Written Opinion mailed Jul. 30, 2019, Patent Application No. PCT/IB2019/053383, 12 pages.
International Search Report and Written Opinion mailed Jul. 30, 2019, Patent Application No. PCT/IB2019/053381, 11 pages.
Kim et al., "Dynamically Adjusting the Minig Capacity in Cryptocurrency With Binary Blockchain," University of Nevada, Las Vegas, Computer Science Faculty Publications, Jan. 1, 2018, 11 pages.
Kokoris-Kogias et al., "OmniLedger: A Secure, Scale-Out, Decentralized Ledger via Sharding," 2017, 16 pages.
Kreder, "BlockReduce: Scaling Blockchain to Human Commerce," Oct. 31, 2018, 9 pages.
Luu et al., "A Secure Sharding Protocol For Open Blockchains," 2016, retrieved from https://web.archive.org/web/20190228023146/https://www.comp.nus.edu.sg/~loiluu/papers/elastico.pdf [Archive Date Feb. 28, 2019], 14 pages.
Nakamoto, "Bitcoin: A Peer-to-Peer Electronic Cash System," Bitcoin, Oct. 31, 2008, https://bitcoin.org/bitcoin.pdf, 9 pages.
Nyffenegger, "Scaling Bitcoin," Master's Thesis, Chair of Economic Theory, Universitat Basel, Aug. 9, 2018, 99 pages.
Ruffing et al., "CoinShuffle: Practical Decentralized Coin Mixing for Bitcoin", ESORICS, 2014, 20 pages.
Satoshi et al., "Connection Limits," Bitcoin Forum, Aug. 9, 2010, https:/bitcointalk.org/index.php?topic=741.0;prev_next=prev, 2 pages.
Stevenroose et al., "IRC Chat Log Feb. 9, 2016," Bitcoin Wizards, Feb. 9, 2016, https://irclog.whitequark.org/bitcoin-wizards/2016-02-09, 8 pages.
The Zilliqa Team, "The Technical Whitepaper", Version 0.1, Aug. 10, 2017, 14 pages.
Todd et al., "Why Aren't We as a Community Talking About Sharding as a Scaling Solution," Reddit, https://www.reddit.com/r/Bitcoin/comments/3u1m36/why_arent_we_as_a_community_talking_about/, Nov. 24, 2015, 8 pages.
Todd, "Re: [Bitcoin-development] Tree-chains Preliminary Summary," https://www.mail-archive.com/bitcoin-development@lists.sourceforge.net/msg04388.html, Mar. 24, 2014, 9 pages.

(56) References Cited

OTHER PUBLICATIONS

UK Commercial Search Report mailed Dec. 14, 2018, Patent Application No. GB1806930.2, 12 pages.
UK IPO Search Report mailed Oct. 23, 2018, Patent Application No. GB1806914.6, 9 pages.
UK IPO Search Report mailed Oct. 24, 2018 Patent Application No. GB1806911.2 8 pages.
Durov, Nikolai, "Telegram Open Network", Jul. 18, 2018, Version of the Text is distributed as Primer Appendix A, 264 pages.

* cited by examiner

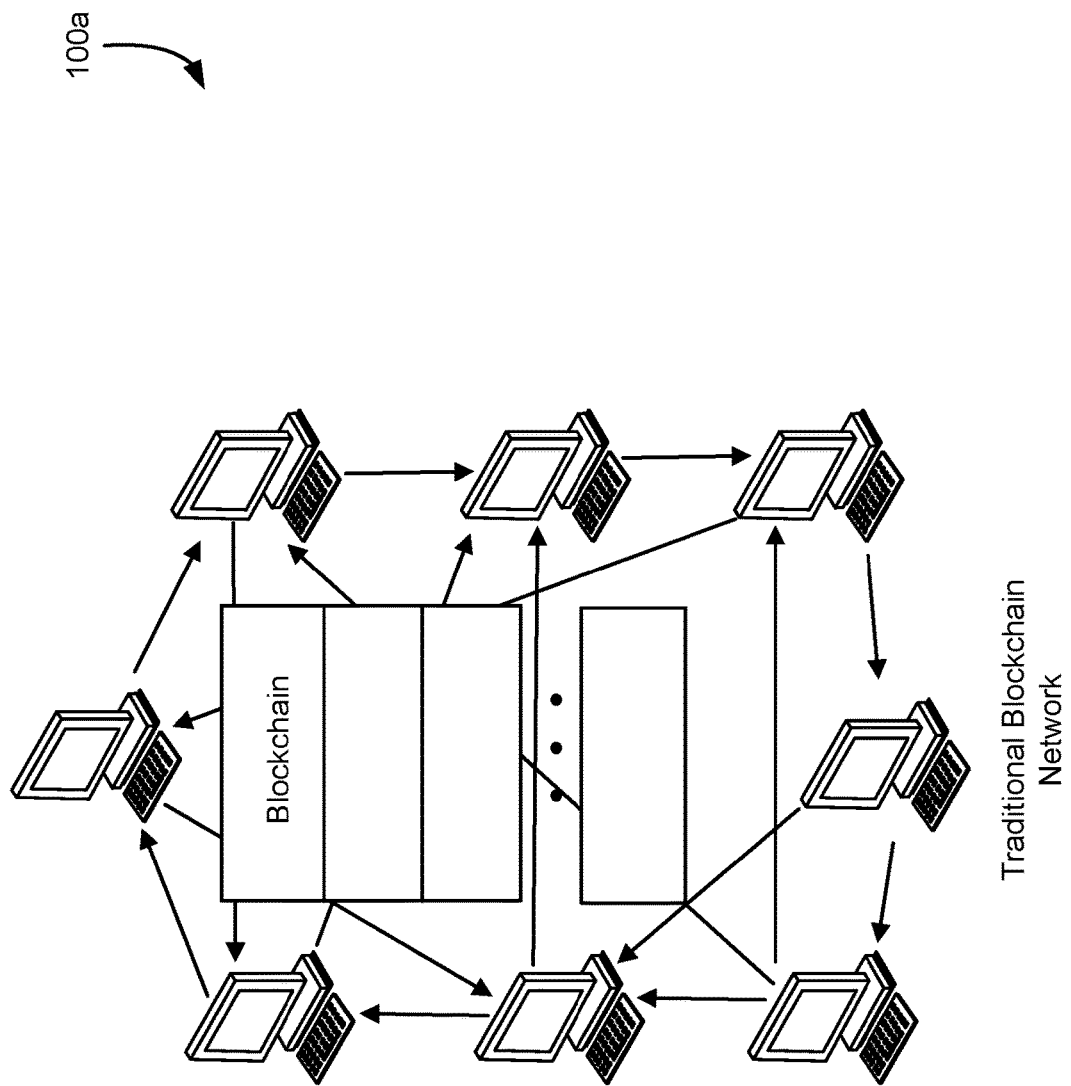

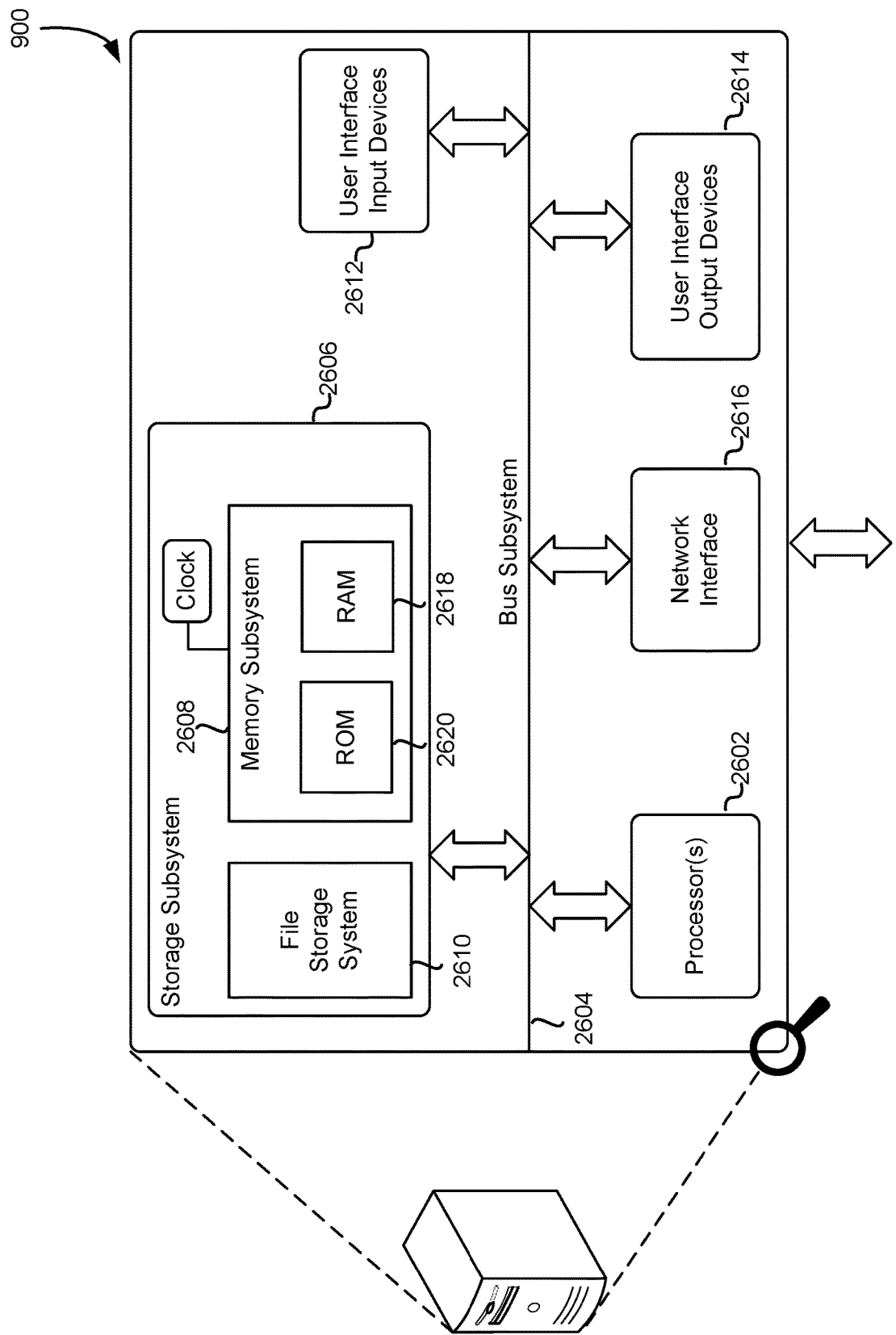

PARTITIONING A BLOCKCHAIN NETWORK

CROSS-REFERENCE TO RELATED APPLICATIONS

This application is a continuation of U.S. patent application Ser. No. 17/051,070, filed Oct. 27, 2020, entitled "PARTITIONING A BLOCKCHAIN NETWORK," which is a 371 National Stage International Patent Application No. PCT/IB2019/053381, filed Apr. 24, 2019, which claims priority to United Kingdom Patent Application No. 1806930.2, filed Apr. 27, 2018, United Kingdom Patent Application No. 1806914.6, filed Apr. 27, 2018, United Kingdom Patent Application No. 1806911.2, filed Apr. 27, 2018, United Kingdom Patent Application No. 1806909.6, filed Apr. 27, 2018, United Kingdom Patent Application No. 1806907.0, filed Apr. 27, 2018, the disclosures of which are incorporated herein by reference in their entirety.

FIELD OF INVENTION

The present disclosure relates to a method for partitioning a blockchain network and a method for validating transactions of a partitioned blockchain network, and relates particularly, but not exclusively, to a method for partitioning the unspent transaction output (UTXO) set of the Bitcoin blockchain and a method for validating transactions of a partitioned UTXO set of the Bitcoin blockchain.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource. The term "Bitcoin" is used herein to include any version or variation that derives from or is based on the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications.

As discussed above, a blockchain network, for example the Bitcoin blockchain network, is a secure distributed computing system. Full nodes of the system persist and manage a copy of the entire blockchain, sending and receiving transactions, validating them, and adding blocks to the blockchain based on a shared decentralized consensus protocol. This approach, while secure, does have scaling flaws related to the fact that each transaction is validated and stored by every full node. In terms of validation, this causes delays in network propagation of transactions, as each transaction needs to be validated before it can be propagated onwards towards a miner. Furthermore, delays attributed to validation renders the network and susceptible to "double-spend" related attacks, such as Sybil attacks.

SUMMARY OF INVENTION

The present disclosure aims to improve the scalability, speed, reliability as well as security of the blockchain network through the use of horizontal partitioning, also known as sharding, as well as associated techniques or protocols for allocating and/or validating transactions on a sharded blockchain network. Disclosed herein are:
  A network structure for a sharded blockchain; and
  a sharded UTXO and mempool structure.

Partitioning in the art considers two specific dimensions: horizontal and vertical. In the partitioned sections of a horizontally-partitioned database, known as shards, there are effectively multiple instances of a specific database schema, with data spread across each of these instances, discounting instance redundancy. Vertical partitioning however is the splitting of a given database schema across multiple nodes, whereby attributes of a specific object are spread using normalisation.

Different parties wanting to be involved in blockchain networks can possess a range of computing resources, ranging from small low-powered machines, to server farms. Participating parties are therefore limited by computing resources to a predetermined level of involvement in the blockchain network.

In Bitcoin, the blockchain itself is a set of linked transactions which mark specific changes in the ownership of coins which are mined at the creation of a block. During transaction validation, one of the checks required is to check that there has not been a double spend. A double spend is when a transaction output has been referenced in a transaction input either already in the Bitcoin mempool or confirmed on the blockchain. A mempool is a known to be a reference to a memory pool or area for Bitcoin transactions that each full node maintains for itself. Traditionally, after a transaction is verified by a node, it waits inside a mempool until inserted into a block. To make the validation of transactions more efficient in terms of checking transaction inputs, instead of validating the entire blockchain, the current state of the network is kept within an independent structure known as the UTXO set. This structure contains each transaction output which is yet to be spent by a transaction, which can include coinbase and standard transactions.

According to an aspect of the present disclosure, there is provided a computer-implemented method of partitioning a blockchain network into shards. The method comprises: identifying a transaction id of a blockchain transaction; and allocating the transaction to a shard based on the transaction id.

Partitioning a blockchain network into shards enables users to choose their own level of involvement with the blockchain network. Each user can choose to be a member of one or more shards. A user who is a member of fewer than all shards requires less storage space to store all of the transactions allocated to the shards of which the user is a member. Allocating a transaction to a shard based on its transaction id provides the advantage that the resulting shard sizes will be approximately equal, thereby avoiding placing undue burden on members of a larger shard relative to members of a smaller shard, while at the same time enabling the transactions and associated verifications to be performed accurately, and without any undue delays.

The users referred herein may be associated with one or more nodes or computing devices, and these nodes may also be referred to as client entities in the partitioned blockchain network. Hereinafter, a reference to a user may be also understood to be a reference to the node or entity associated with the user (that may own or control the node or entity that is part of the sharded or partitioned blockchain network). Each node may be communicatively coupled with at least one or more other nodes in the partitioned blockchain network.

These advantages discussed herein that are associated with this as well as other aspects of the present disclosure (discussed below) are attributed to the structure of the nodes and resulting network topology and architecture of the sharded blockchain network and protocols associated with the nodes of the network. Receiving, storing and/or validating UTXO's in such a sharded network is performed using the described and claimed methods, rules or protocols for communication, data storage, data sharing as well as validation techniques for nodes within each shard, as well as based on the rules and protocols associated for communication with nodes belonging to different shards.

These specific structures, methods of data flow, transaction allocation and validation protocols will be further explained below with respect to the various embodiments of the present disclosure. Advantageously, the sharded network structure or architecture and associated methods described herein for allocation of transactions and validation of such allocated transactions within the sharded blockchain network enable novel techniques for data flow, data storage and UTXO validation checks. Furthermore, these techniques advantageously prevent double spend attacks, such as Sybil attacks in the Bitcoin blockchain in view of the structure and data communication/validation protocols.

The method may further comprise the step of performing an operation using the transaction id. The step of allocating the transaction to a shard may be based on the result of the operation.

This provides the advantage that the arrangement of the shards can be tailored dependent on the choice of the operation.

The operation may comprise a modulo operation.

This provides the advantage that a desired number of equal-sized shards can be more easily generated.

According to the present disclosure, there is provided a further computer-implemented method of partitioning a blockchain network into shards. The method comprises: identifying a parent blockchain transaction, the parent transaction defined by an output which corresponds to an input of a child blockchain transaction; and allocating the parent transaction and the child transaction to the same shard.

Partitioning a blockchain network into shards enables users to choose their own level of involvement with the blockchain network. Each user can choose to be a member of one or more shards. A user who is a member of fewer than all shards requires less storage space to store all of the transactions allocated to the shards of which the user is a member. Allocating a transaction to a shard based on identifying a parent blockchain transaction, the parent transaction defined by an output which corresponds to an input of a child blockchain transaction, and allocating the parent transaction and the child transaction to the same shard provides the advantage that validation operations performed by users who are members of a particular shard may be performed while requiring less information to be transmitted to and from users who are members of different shards, because a child transaction being validated will always have a parent transaction which is a member of the same shard.

A parent transaction may be identified using an input of a plurality of inputs of the child blockchain transaction. The input used may be selected on the basis of its index. The index may be 1, in which case the input used is the first input of the plurality of inputs.

This provides the advantage of enabling a child transaction having multiple inputs to be allocated to a shard.

A parent transaction may be identified using a largest subset of inputs of a plurality of inputs of the child blockchain transaction. For example, in the instance where a child transaction has five inputs, where two of the five refer to two outputs of an earlier transaction, and each of the remaining three inputs refer to three different earlier transactions, the parent transaction is defined as the earlier transaction to which the two inputs both refer as they are the largest subset of inputs.

This provides the advantage that, for a child transaction having multiple inputs, the amount of information required from users who are members of different shards is reduced.

According to the present disclosure, there is also provided a computer-implemented method for validating a blockchain transaction. The method comprises: requesting at least one UTXO referenced by at least one respective input of the transaction from a member node of at least one shard comprising at least one UTXO; obtaining validity data of at least one UTXO from at least one node; and performing a validation check on at least one input using the validity data.

This method enables validation of a blockchain transaction to take place in a sharded blockchain network. The advantage provided by this method is that each user can choose to be a member of one or more shards, and a user who is a member of fewer than all shards requires less computing power to validate all of the transactions allocated to the shards of which the user is a member.

According, the present disclosure relates to a computer-implemented method of validating a blockchain transaction associated with a blockchain network, wherein the blockchain network is partitioned into a plurality of shards, each shard comprising at least one member node, and wherein each node in the blockchain network is member of at least one shard among the plurality of shards, the method comprising the steps of: requesting, by a requesting node, at least one UTXO referenced by at least one respective input of the transaction from a member node of at least one shard comprising at least one UTXO, wherein the member node is associated with a set of UTXOs that relate to one or more transactions allocated to each shard that that the member node is a member of; based on a determination that the requested at least one UTXO is available from the member mode, the method further comprising the steps of: performing a validation check on at least one input based on validity data associated with at least one UTXO; based on a determination that the transaction is valid, adding the transaction to a mempool associated with the requesting node; and propagating the transaction to other member nodes of the at least one shard that the requesting node is a member of.

According to the present disclosure, there is further provided a computer-implemented method for validating a blockchain transaction. The method comprises: identifying at least one shard comprising at least one UTXO referenced by at least one respective input of the transaction; transmitting the transaction to at least one member node of at least one shard; and performing a validation check on at least one input using validity data of the UTXO.

This method enables validation of a blockchain transaction to take place in a sharded blockchain network. The advantage provided by this method is that each user can choose to be a member of one or more shards, and a user who is a member of fewer than all shards requires less computing power to validate all of the transactions allocated to the shards of which the user is a member.

Any of the above methods may further comprise the step of communicating a request for shard membership information of a node to another node.

This provides the advantage that the node seeking shard membership information is provided with a mechanism for locating that information more easily.

Any of the above methods may further comprising the step of communicating shard membership information of a node to another node.

This provides a mechanism for shard membership information of nodes to be transferred between nodes, thereby providing the advantage of decreasing the likelihood that a node performing a validation operation will fail.

In some embodiments, the methods includes the step of communicating or broadcasting shard membership information of a node to all other nodes in the shard associated with the node and/or one or more other nodes in the network. The method may also include that the communication is performed using a modified addr message, wherein the modified addr message includes an indication of one or more shards that the node is associated with.

The communication may be performed using a modified addr message.

This provides the advantage of providing a more secure mechanism for exchanging shard membership information between nodes.

The disclosure also provides a system, comprising:
a processor; and
memory including executable instructions that, as a result of execution by the processor, causes the system to perform any embodiment of the computer-implemented method described herein.

The disclosure also provides a non-transitory computer-readable storage medium having stored thereon executable instructions that, as a result of being executed by a processor of a computer system, cause the computer system to at least perform an embodiment of the computer-implemented method described herein.

BRIEF DESCRIPTION OF THE DRAWINGS

Preferred embodiments of the present disclosure are described below, in a general and not in a limitative sense, with reference to accompanying drawings, in which:

FIGS. 1a and 1b illustrate a comparison between a traditional blockchain network (FIG. 1a) and a sharded blockchain (FIG. 1b) network according first embodiment of the present disclosure;

FIG. 9 is a schematic diagram illustrates a computing environment in which various embodiments of the present disclosure can be implemented.

DETAILED DESCRIPTION

In the current blockchain network, different nodes are connected peer-to-peer in a largely unstructured fashion (with the exception of a number of hardcoded network seeds within the Bitcoin client to aid node discovery). These nodes communicate to share valid transactions, blocks, and information regarding other nodes.

Structure of a Sharded Network

Figure 1B:
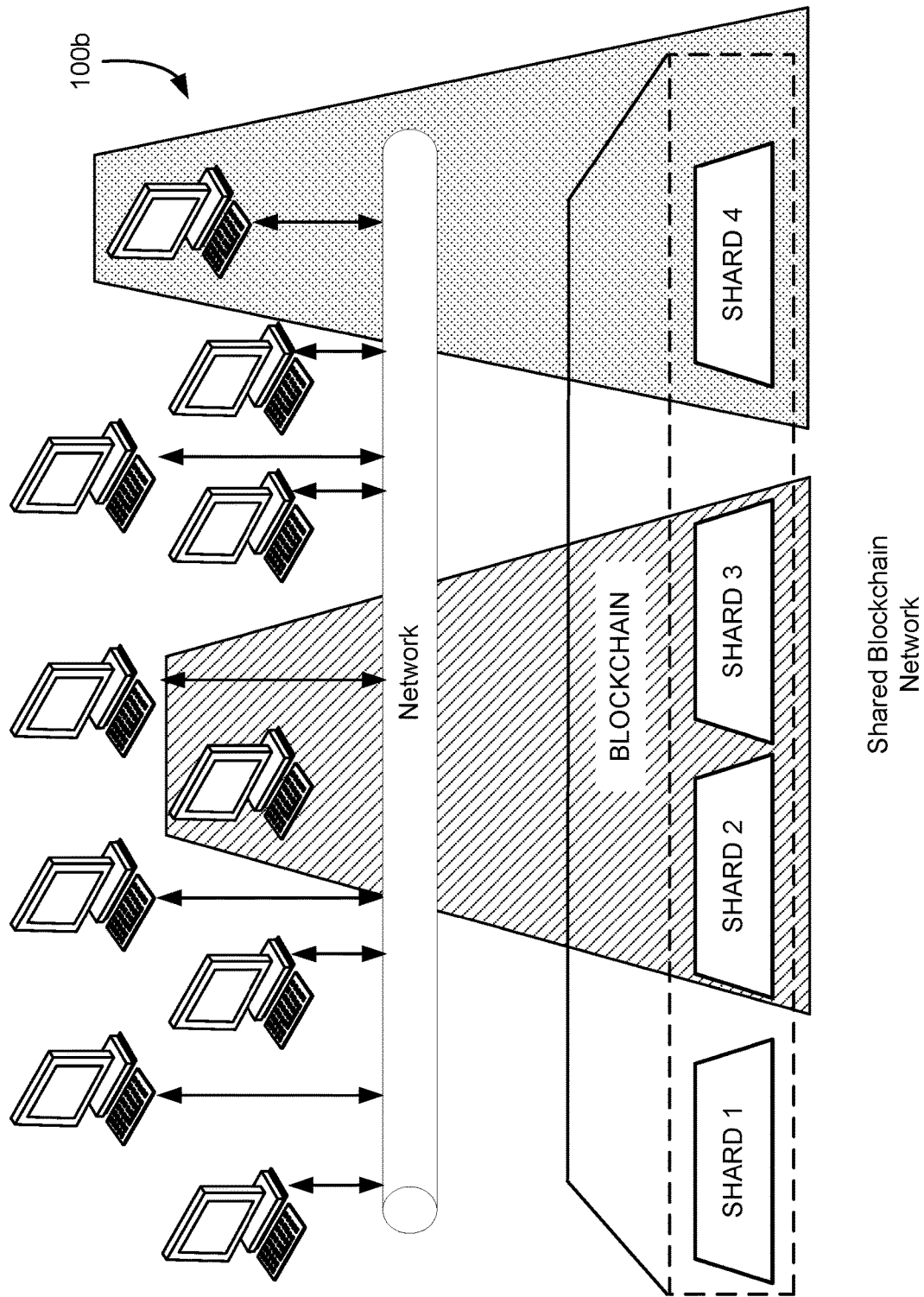

A first embodiment of the present disclosure can be seen in FIG. 1b, which depicts a structure of a sharded blockchain network 100b according to the present disclosure. FIG. 1a on the other hand shows a structure of the existing, i.e. prior art blockchain network 100a.

According to the present disclosure, to reduce the reliance on having expensive and powerful computing resources for parties to participate in a predetermined level of involvement in the blockchain network, parties may be allowed to be members of any number of shards of a sharded blockchain network. This means small parties, including hobbyists, can choose to be members of a single shard of the network shown in FIG. 1b, and large parties, such as financial institutions, can choose to be members of many or even all shards of the sharded blockchain network of FIG. 1b. This approach accommodates entities or parties that may require transaction history security, for instance to ensure that these parties that want or need greater security may be able to validate and store every transaction in the blockchain, while other parties or entities that may not wish to or require the same (greater) level or may want a lighter weight involvement, may also participate in the same sharded blockchain network of FIG. 1b and may store just a subset of the blockchain.

As can be seen in FIG. 1b, a particular node can be a member of one or more shard groups. This is seen by the shaded lines shown in this figure, where a node within the shaded area is a member of both, shard 2 as well as shard 3. For communication, in the current Bitcoin network and Bitcoin SV (BSV) client, a list of available peers, i.e., nodes in the network, holds information regarding nodes it can connect to, distribute to, and receive from. In a sharded blockchain according to the first embodiment, additional information is held, including of which shard each node is a member. In some implementations, for handling transaction propagation across the network, each node shown in the sharded network in FIG. 1b arranged or configured such that it may communicate with at least a single node from each shard to propagate their transactions destined for a different shard. In some implementations, the information held by each node may be in the form of a data structure to indicate nodes it can connect to, distribute to, receive from, and the shard that it belongs to in the sharded network seen in FIG. 1b. Other details pertaining to the node, such as an identifier, entity association etc. may also be held. This data structure may be held within a memory associated with each node, or may be held in a memory associated with the shard, for instance.

In a second embodiment that relates to a sharded network as seen in FIG. 1b, a technique where the nodes communicate with multiple other nodes within a single shard is explained. This technique advantageously prevents a "Sybil style" attack within a blockchain network A Sybil attack is an attack where a single adversary or malign entity may be controlling multiple nodes on a network, unknown to the network. For example, an adversary may create multiple computers and IP addresses, and may also can create multiple accounts/nodes in an attempt to pretend that they all exist. The manifestation of such an attack may be seen by the following example implementations. If an attacker attempts to fill the network with clients that they control, then a node may then be very likely to connect only to attacker nodes. For example, the attacker can refuse to relay blocks and transactions for a node, effectively disconnecting that particular node from the network. This can also be manifested by the attacker relaying blocks that they create, effectively putting a node or entity on a separate network, thereby leaving a node and transactions associated with that node or the entity it represents open to double-spending attacks. Sybil attacks are thus a problem for existing blockchain networks.

Figure 2:
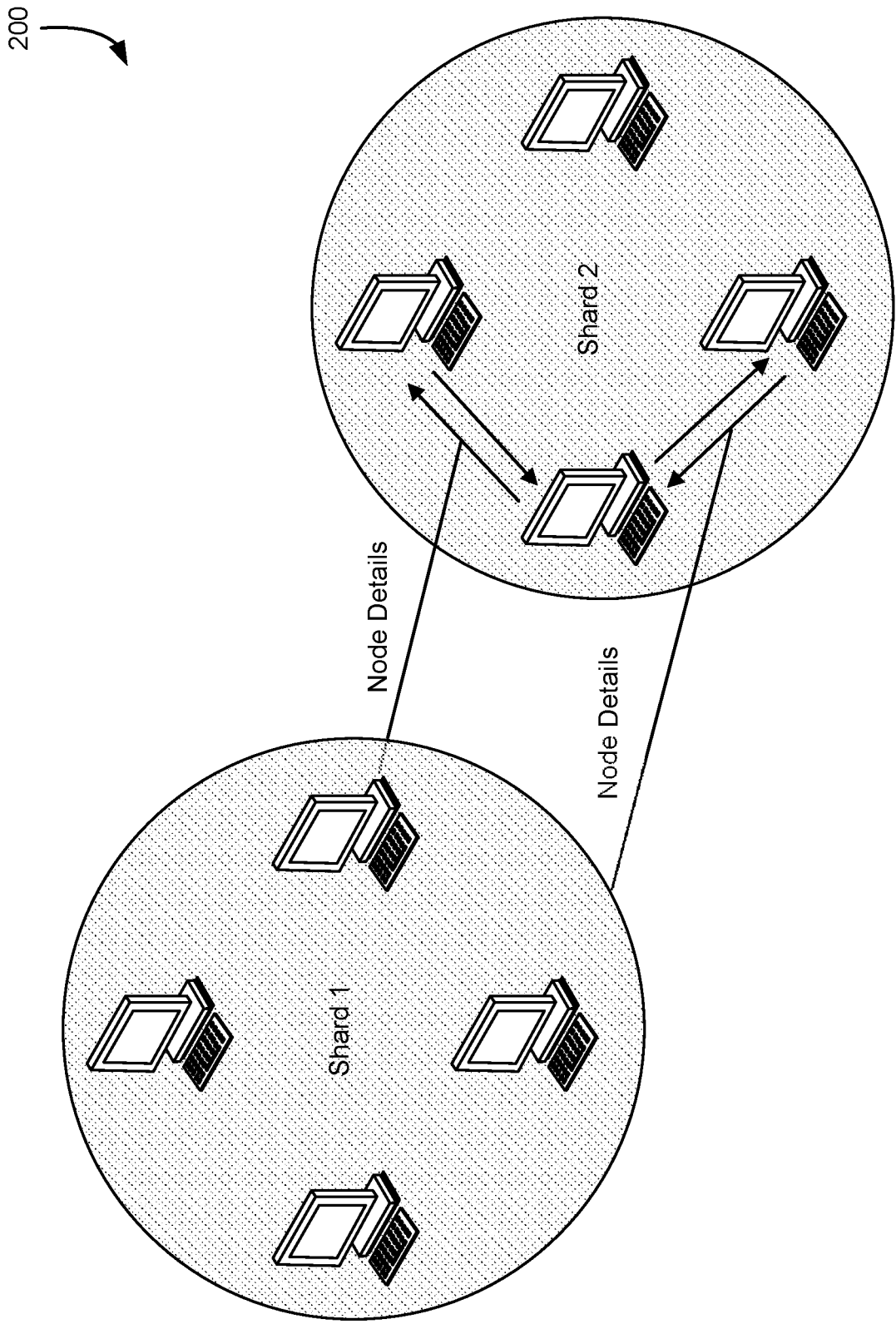
FIG. 2 illustrates node usage rotation used in relation to a second embodiment of the present disclosure.

To prevent Sybil attacks in a sharded blockchain network such as seen in FIG. 1b, nodes are configured to communicate with multiple or all other nodes within a single shard, according to the second embodiment. As discussed above, Sybil attacks can effectively disregard transactions sent from a particular node, preventing their propagation further through the network. Therefore, in the second embodiment of the present disclosure, a technique performed in an example network 200 by which nodes in a given shard can exchange information regarding nodes in other shards, and rotate their usage, as is seen in FIG. 2.

According to the second embodiment, each node in the sharded network can broadcast every transaction to each other. If a given node is not a member of the shard that is associated with a transaction (this association is described below with reference to the third and fourth embodiments), then instead of doing a full transaction validation, it performs basic transaction-level checks before propagating onwards. It is noted that in some implementations, the protocols and rules discussed above in relation to the second embodiment are related to and considered to be part of one or more or all of the other embodiments of the present disclosure discussed herein.

At different or specific times/instances, details about other nodes can also be shared between nodes in specific shards. This is performed according to the second embodiment of the present disclosure using a modified version of addr protocol messages. An implementation of addr messages that currently exist as part of the Bitcoin protocol is used to list or identify one or more IP addresses and ports. For example, a getaddr request may be used to obtain an addr message containing a bunch of known-active peers (for bootstrapping, for example). addr messages often contain only one address, but sometimes contain many more, and in some examples, up to a 1000. In some examples, all nodes broadcast an addr containing their own IP address periodically, i.e., every 24 hours. Nodes may then relay these messages to their peers, and can store the addresses relayed, if new to them. This way, the nodes in the network may have a reasonably clear picture of which IPs are connected to the network at the moment of, or after connecting to the network. In most cases the IP address gets added to everyone's address database because of an initial addr broadcast.

An implementation of a modified addr protocol according to the present disclosure, in addition to the above may be capable of transmitting additional information on which to shard or shards a particular node belongs. For instance, in the modified addr protocol, when a node in a shared network such as FIG. 1b joins a particular shard in the network, then what is broadcast as part of the addr message may also include a field identifying the one or more shards it is a member of. This information is also therefore returned in response to a getaddr request from a peer in the network of FIG. 1b. As discussed in the first embodiment, such information may be based on a data structure associated with each node and/or each shard to which the node is associated with. In some embodiments, the modified addr protocol may also include the status of the shards of which the node is a member of and/or the status of the node itself. For instance, details of the number of nodes in each member shard may be identified, or if a particular shard is active, or the number of active nodes in a given shard may also be identified.

Allocating Transactions to Shards in a Sharded Network

As described above, in a sharded blockchain network, transactions are not validated and stored by every node, but instead they are allocated to one or more specific shards. Therefore, a strategy for allocating transactions to different shards is required. Two possible embodiments will be described below and are referred to as "transaction id-based" sharding according to a third embodiment of the present disclosure and "input-based" sharding, according to a fourth embodiment of the present disclosure.

In some implementations, it is possible that the existing Bitcoin protocol would be likely to undergo a fork in order to initiate either scheme. When nodes in a given shard subsequently receive a transaction, they may check it has been sent to the correct shard. This approach provides balancing of transactions across shards.

Either sharding method may be applied to the blockchain retroactively, and to any extent. That is, either method may be applied such that a sharded network is defined as existing from the time of the first block in the blockchain (the so-called genesis block in the case of the Bitcoin blockchain) all the way through to an arbitrarily chosen block number in the future.

The sharding methods described below may be applied a multiple number of times in sequence, and in any order. For example, transaction-id sharding may be performed in the first instance, and input-based sharding may be performed at a later date. Furthermore, either one of the methods may be applied retroactively, as described above, and further to this, either method may be subsequently applied. The number of shards, n, may be chosen each time a sharding method is applied and allows the protocol to scale by increasing the number of nodes. The number of nodes may be chosen based on the number of total nodes on the network, the size of the blockchain, and/or on other characteristics. For both of the sharding methods described below, the manner in which the transactions are stored by each node once sharding has taken place will also be described.

Transaction Id Based Shard Distribution

Figure 3:
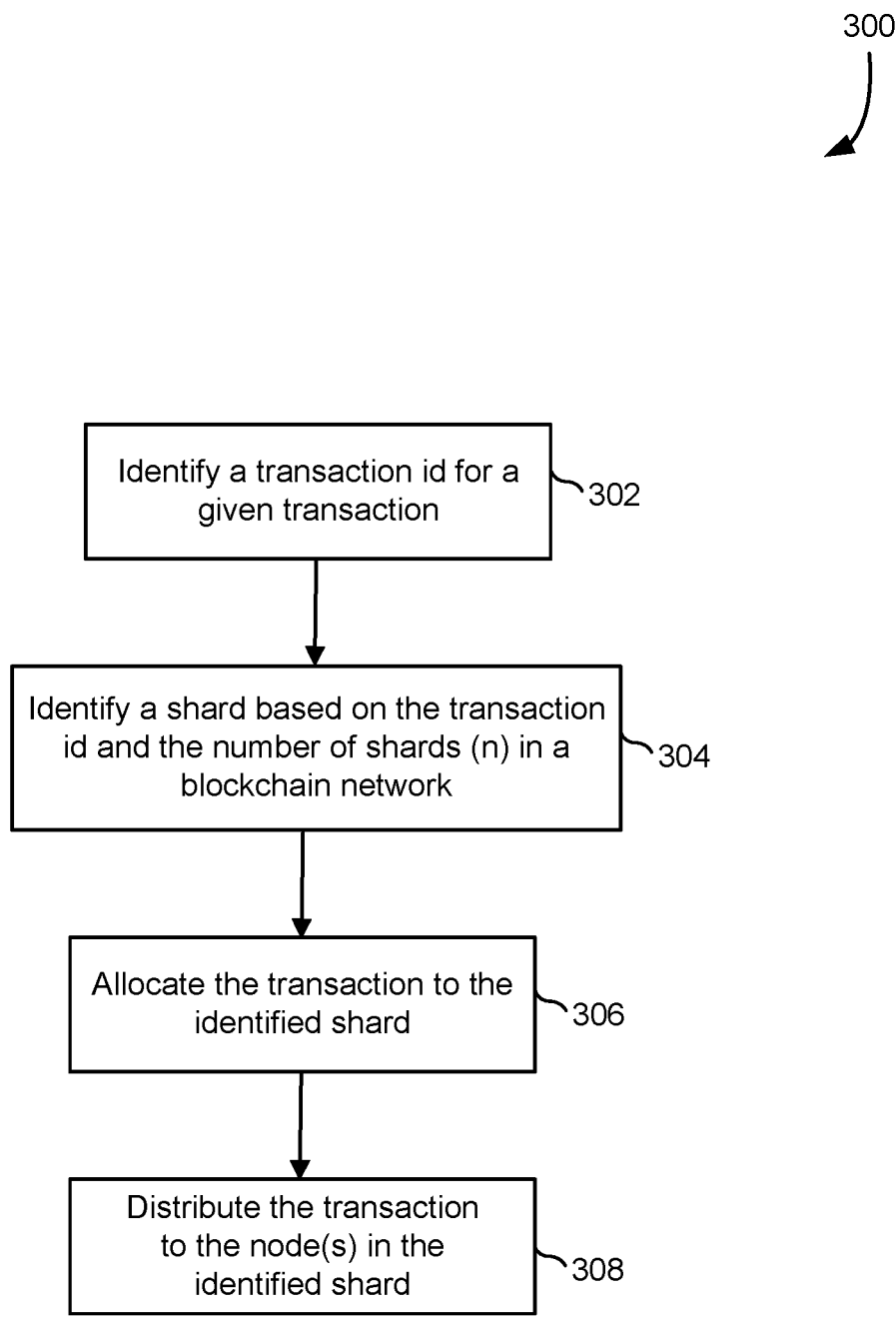
FIG. 3 illustrates a method of allocating a transaction to a shard according to a third embodiment of the present disclosure.

In a horizontally-partitioned blockchain, as each shard does not contain and handle all transactions on the network, a strategy for allocating transactions to different shards is required. Furthermore, any sharding method needs to be capable of performing further sharding. In a third embodiment of the present disclosure, as explained with the help of FIG. 3 and method 300, transaction distribution across shards is handled based on a transaction id (txid).

In step 302, the transaction id for a given transaction is created, indicated as txid. In some implementations, this txid is obtained as a result of applying a SHA256 function to the transaction data.

In step 304, using this transaction id, an operation is carried out based on the txid and the available number of shards in the sharded network. In some implementations, a modulus of the number of shards currently active on the blockchain network is applied to the transaction id, i.e., shard number=txid mod n, where n is the (desired or active) number of shards.

In step 306, the result of step 304 then corresponds to the shard to which the given transaction is allocated.

In step 308, once allocated in step 306, the transaction is distributed to the identified shard, i.e., the transaction is to be distributed to nodes comprised in the identified shard in step 306.

Therefore, when nodes in a given shard receive a transaction, they can easily check it has been sent to the correct shard. In some embodiments, such checking may be facilitated based on data structures associated with each node that include information associated with the node, as discussed above in the first embodiment. Advantageously, this approach provides an even balancing of transactions across shards.

Shard count on the network can be arbitrarily chosen on the basis of a number of parameters, including:
Number of total nodes on the network; and
The size of the blockchain.

Input-Based Shard Distribution

Figure 4:
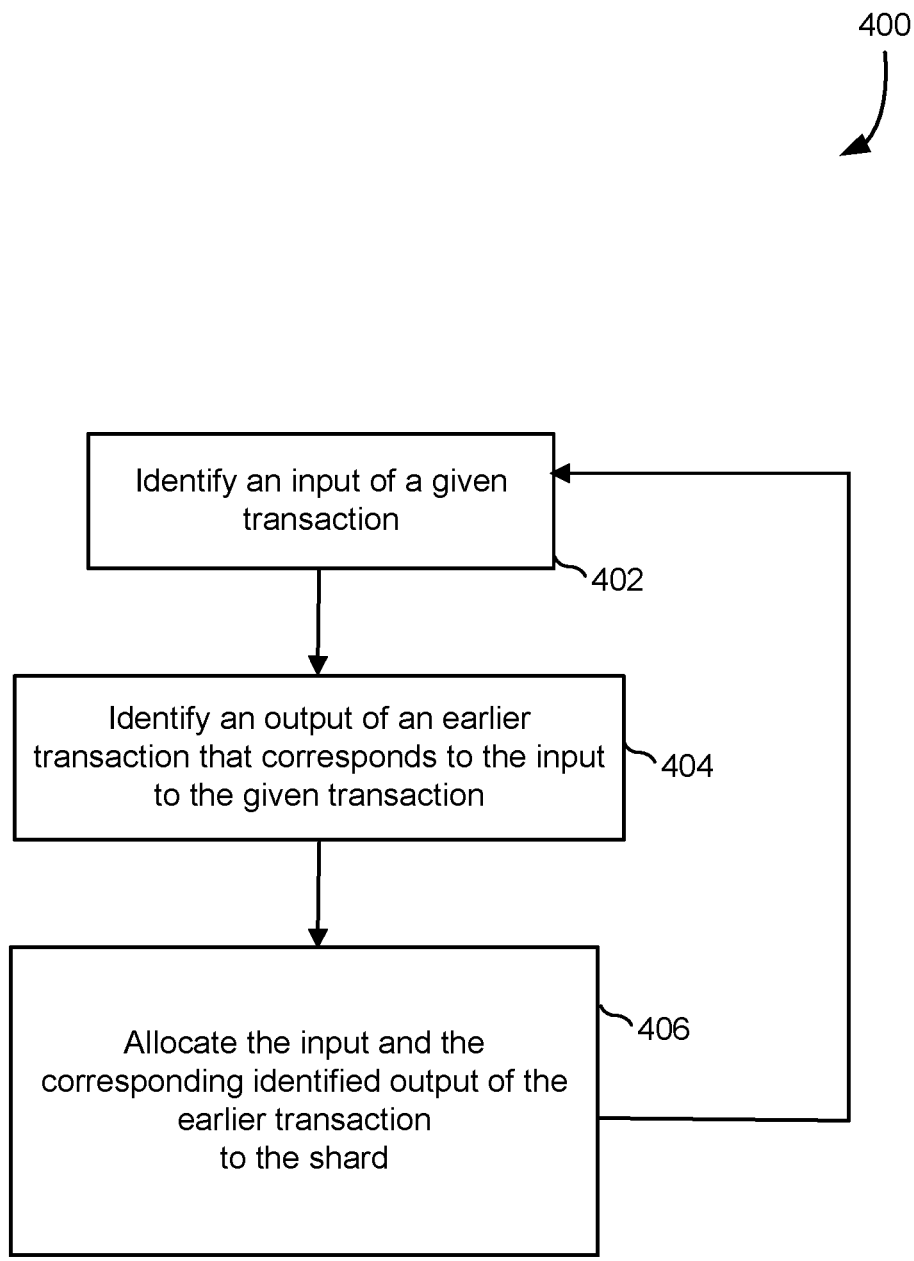
FIG. 4 illustrates a method of allocating a transaction to a shard according to a fourth embodiment.

A sharding method according to a fourth embodiment of the present disclosure as explained with the help of the flow diagram in FIG. 4 and method 400.

In this embodiment, in step 402, an input of a given transaction is identified. In some implementations, this is the first input for the transaction.

In step 404, an output of an earlier transaction to which the input in step 402 refers to is identified.

In step 406, the results of step 402 and 404, i.e. the corresponding input, and the output from an earlier transaction, are both allocated to the same shard in the sharded network as seen in FIG. 1b. In some implementations, this step includes identifying the shard to allocate both the transactions to. In one example, this may be a shard that is associated with the earlier transaction, in case this has already been allocated. In another example, as discussed above, a modified addr broadcast or a response to a getaddr request for either the given or earlier transaction may be used to identify the shard. In other examples, a shard may be selected on a random or a prescribed, i.e. rotation based, basis for both transactions, as long as both are assigned to the same shard. This may be applied for instance if a parent transaction is not identified, i.e., if it is a coinbase transaction that is received.

Step 408 shows that the above process in steps 402 to 406 is iterated to generate chains of transactions linked by their first inputs.

A transaction whose output is referred to by a first input of a subsequent transaction is referred to in this context as a "parent" transaction, and the subsequent transaction is referred to as a "child" transaction.

It is to be noted that the usage of the first input to define a parent in step 402 is not essential to the method; as any input may be chosen to perform the method if a plurality of inputs are present in a given transaction. For example, an earlier transaction may be defined as a parent of a child transaction if a particular number of inputs of the child transaction refer to outputs of transactions in the same shard as the parent. The number of inputs may define a majority number of inputs of the child transaction. Thus, in some implementations discussed above in step 406 the shard that is allocated will be the same as that of the identified parent based on either the number of inputs or indeed the first or any other prescribed particular input to be considered.

It is to be noted that the above two sharding methods of the third and fourth embodiments may be performed sequentially, in any order, and that the two methods may be performed multiple times as desired. For example, a blockchain network may be forked in accordance with Input-Based distribution of the fourth embodiment, and subsequently one or more of the resulting forks may be sharded in accordance with Transaction ID-Based distribution of the third embodiment.

UTXO Set/Mempool Sharding

Figure 5:
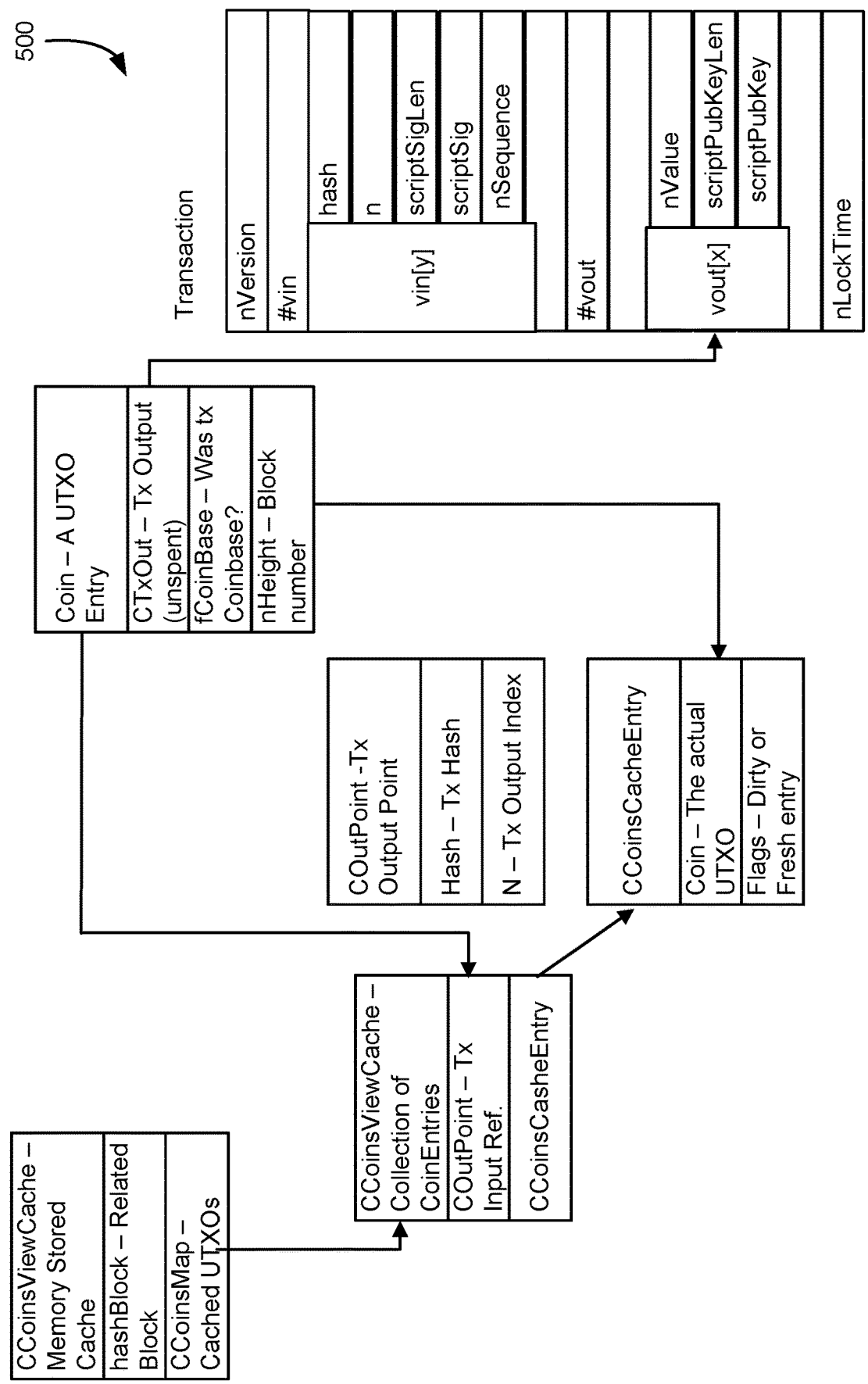
FIG. 5 illustrate a UTXO data structure of the prior art.

In the Bitcoin network currently, every node maintains its own UTXO set, which is checked and updated during validation. An example of a UTXO set in a UTXO data structure 500 is shown in FIG. 5.

Figure 6:
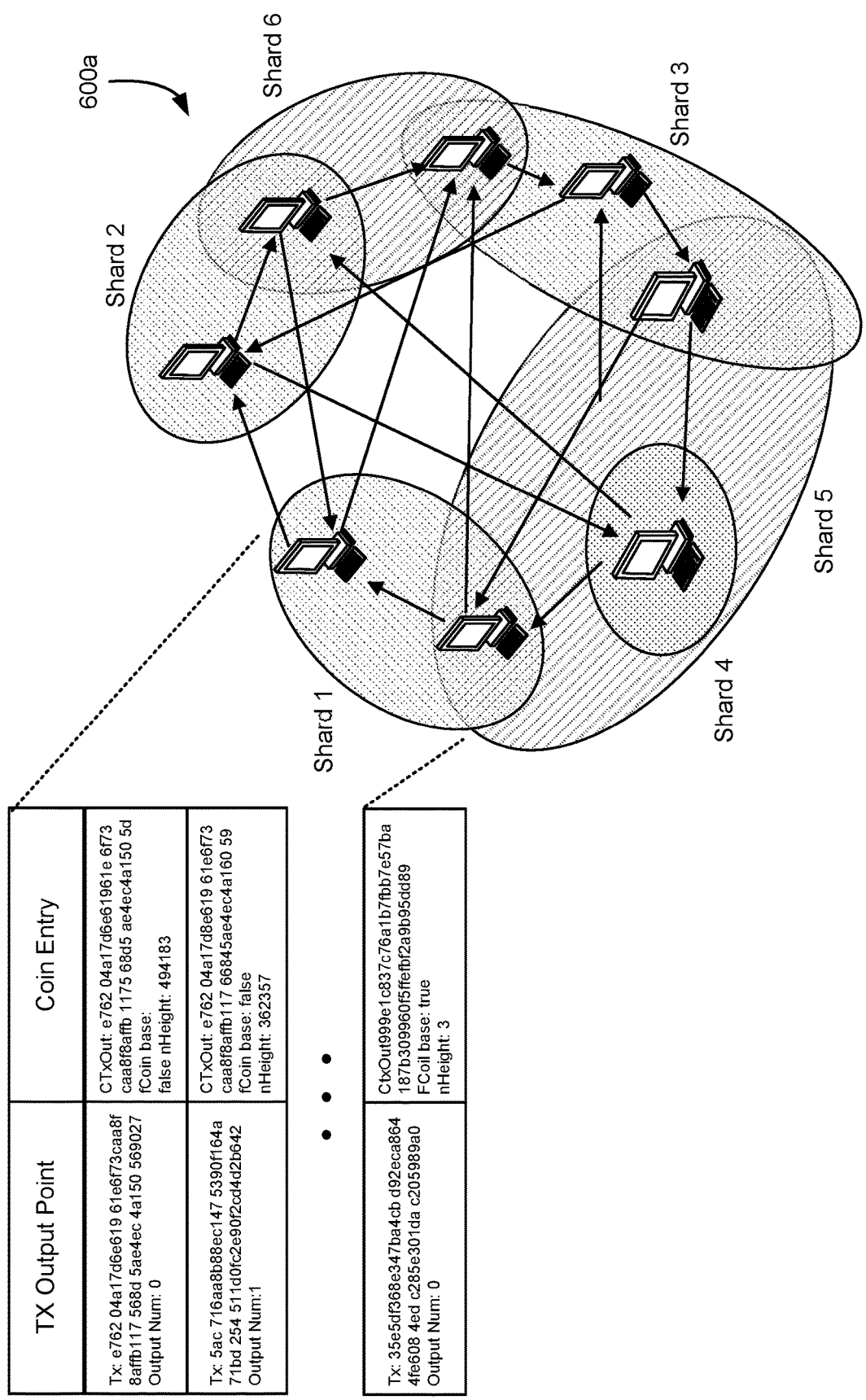
FIG. 6 illustrates a fifth embodiment of the present disclosure.

In accordance with a fifth embodiment of the present disclosure, in a sharded blockchain (such as shown in FIG. 1b), each member node of one or more shards has a UTXO set related to the transactions which are related to each shard of which the node is a member. This is further illustrated in FIG. 6 with example 600a, which depicts the nodes that are members of more than one shard. These are seen by the overlapping distinctly shaded regions in this figure. It will be understood that in some implementations, such UTXO sets, hereinafter referred to as sharded UTXO's, in relation to the fifth embodiment may relate to and considered to be part of one or more or all of the other embodiments of the present disclosure discussed herein.

Transaction Validation

For transactions to validate, the UTXO set needs to be checked and updated in the Bitcoin network. The present disclosure provides a new version of this process for implementing validation for a sharded blockchain, when the UTXO set is sharded. As described above, each node on the sharded blockchain, such as in FIG. 1b, is associated with or maintains a list of nodes on the network, including information of which shard they are members. This is discussed above, in relation to the first embodiment.

Two methods are described below for transaction validation according to the present disclosure, which can be used for checking the UTXO set. These are named Transaction Shard Validation, according to the sixth embodiment; and UTXO Shard Validation, according to the seventh embodiment of the disclosure, respectively.

Transaction Shard Validation

In the sixth embodiment, transaction validation is carried out by the shard to which the transaction is allocated. As described above in relation to the third embodiment, transactions are distributed to a shard using the result of a modulo function applied to the transaction id. Because a transaction can have inputs from different shards, validation nodes communicate with other shards for UTXO checks.

Figure 7A:
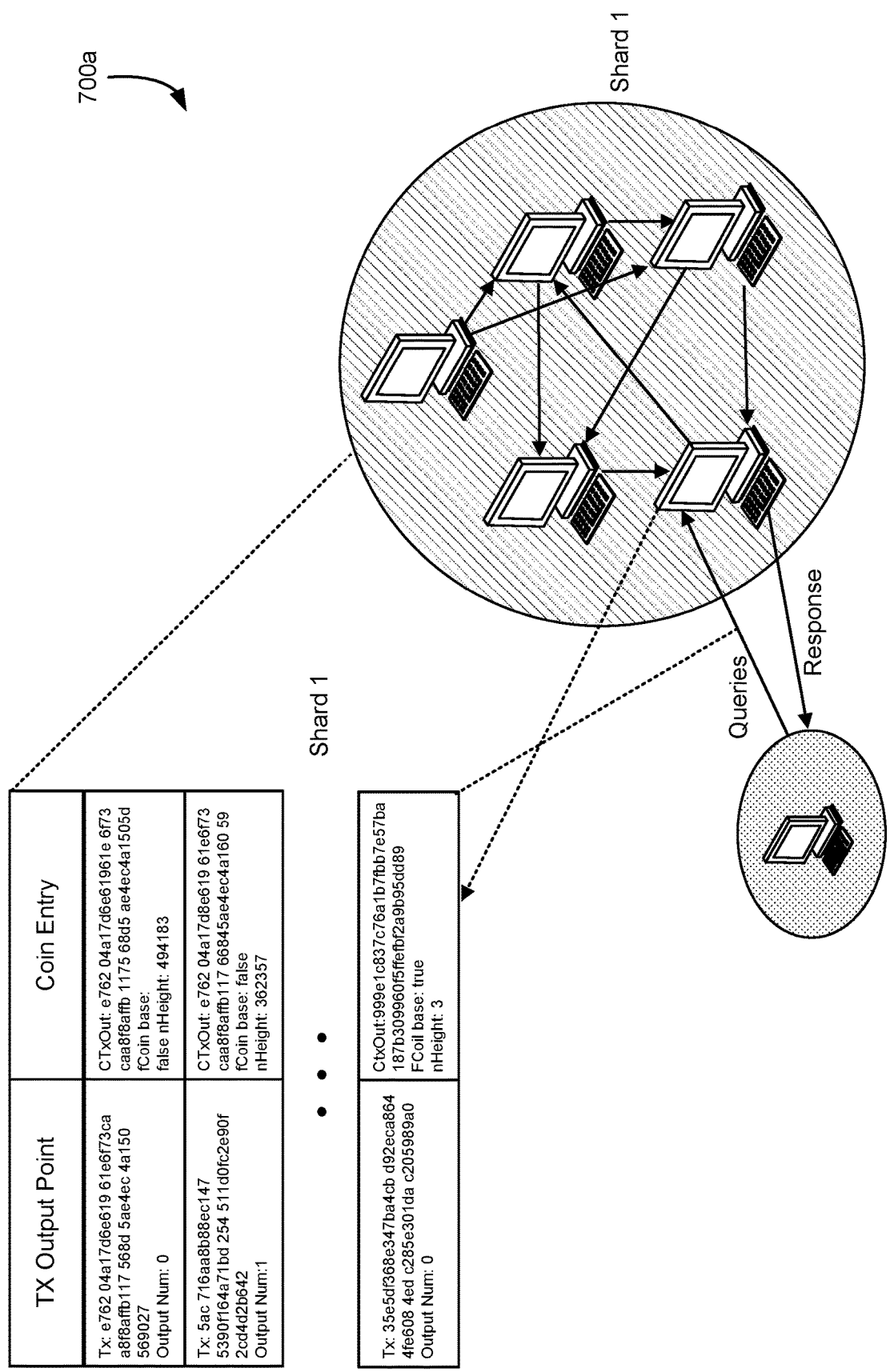
FIGS. 7a and 7b illustrate a sixth embodiment of the present disclosure.
Figure 7B:
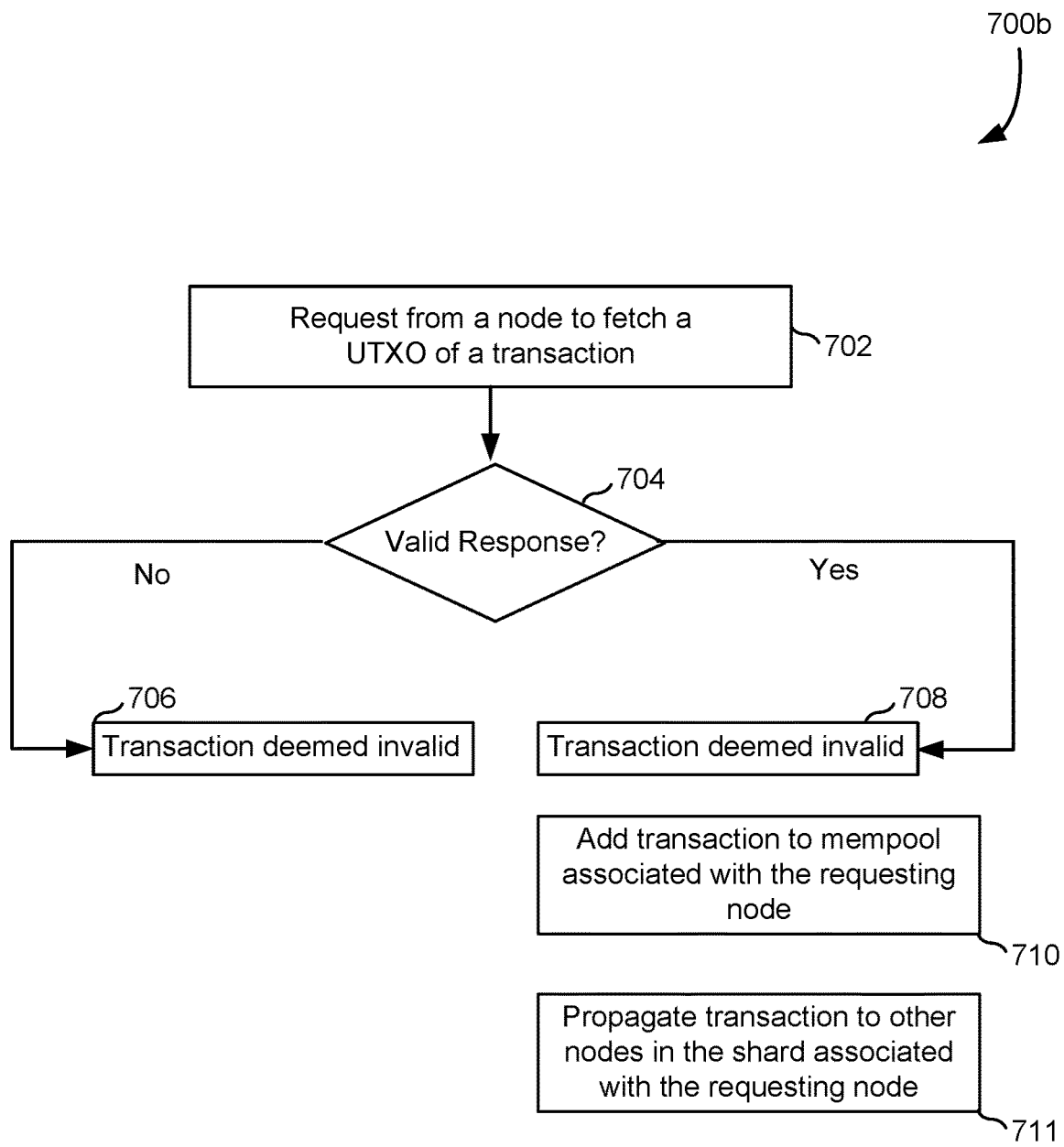

Referring to FIG. 7a, the UTXO set check, as presented in example 700a and carried out between nodes in different shards will now be described. This process is also explained in relation to FIG. 7b with method 700b.

According to the sixth embodiment, a node in Shard 4 makes a request to the nodes in Shard 1 that are known to it to fetch the UTXO. This is seen in step 702. The shard numbers are specified for illustration only, and any given node associated with any given shard may perform this request.

The validity of the response received is then assessed in step 704. If none of the nodes have the UTXO, a null response is given. In this case, the transaction in question is deemed invalid in step 706. No further propagation of the transaction will take place, in this case. In some cases, a transaction is also deemed invalid if there is a script error, for instance, or any indication that the UTXO is not available.

Where a UTXO of the given transaction is received, the transaction input is deemed as valid in step 708. As discussed in the background section, it is known that software clients or programs or applications installed on nodes may perform this validation on a UTXO by executing its locking and unlocking scripts. In some implementations, this is referred to as the validity data for the transactions. If execution of the locking and unlocking scripts evaluate to TRUE, the transaction is valid and the transaction is written to the blockchain. Furthermore, as also discussed above, one of the validity checks is to check that there has not been a double spend. In some implementations, when a node receives a transaction, it will look up the UTXOs that the transaction spends in a data structure associated with the node, or of the associated shard.

In step 710 the transaction in question is then added to shard 4's or the node on shard 4's mempool.

In step 711, the transaction is then propagated to other nodes in shard 4.

UTXO Shard-Based Validation

In the seventh embodiment, transactions are propagated to the shards (of a sharded network as seen in FIG. 1b) containing the UTXOs of a given transaction.

Figure 8A:
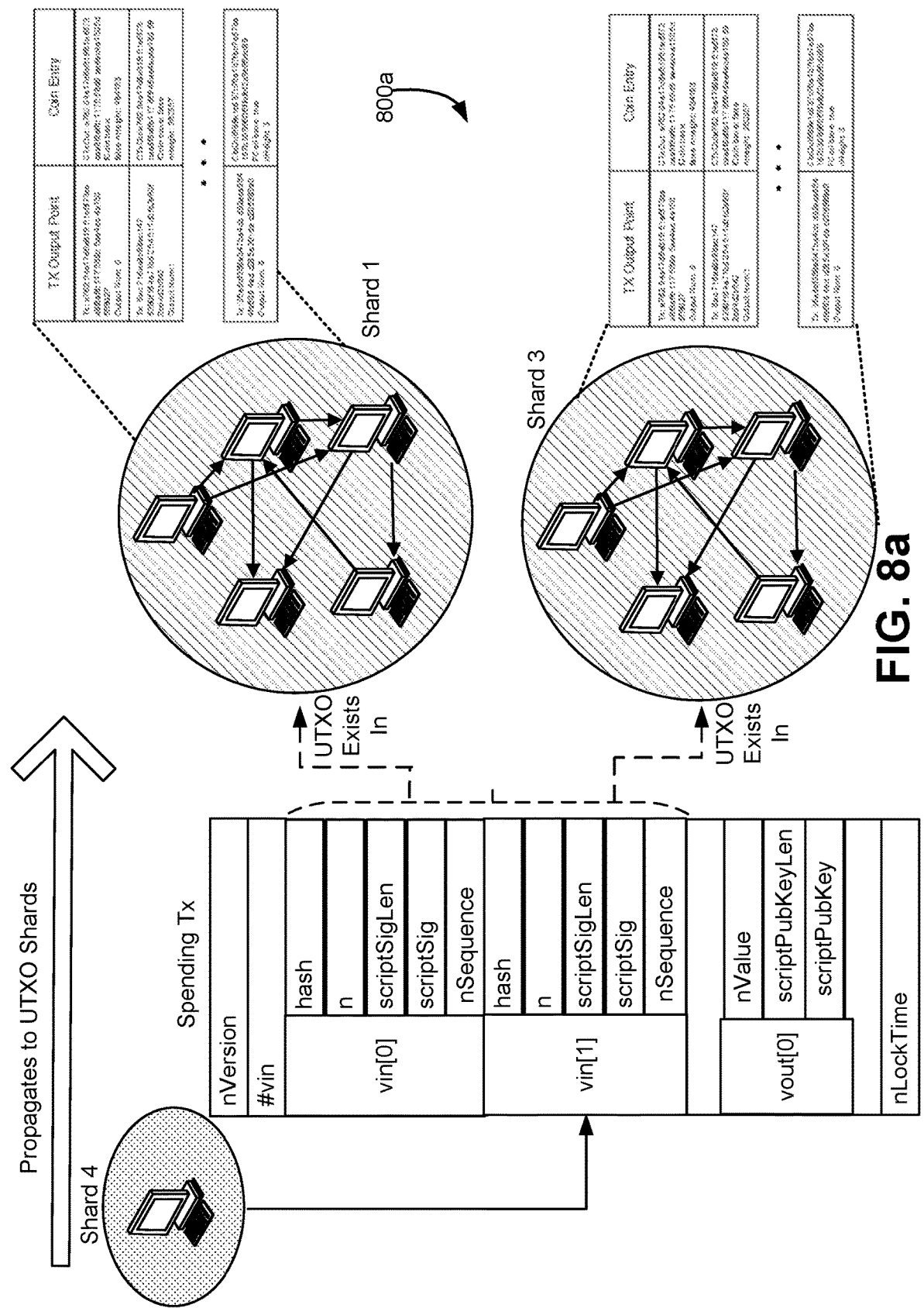
FIGS. 8a and 8b illustrate a seventh embodiment of the present disclosure.
Figure 8B:
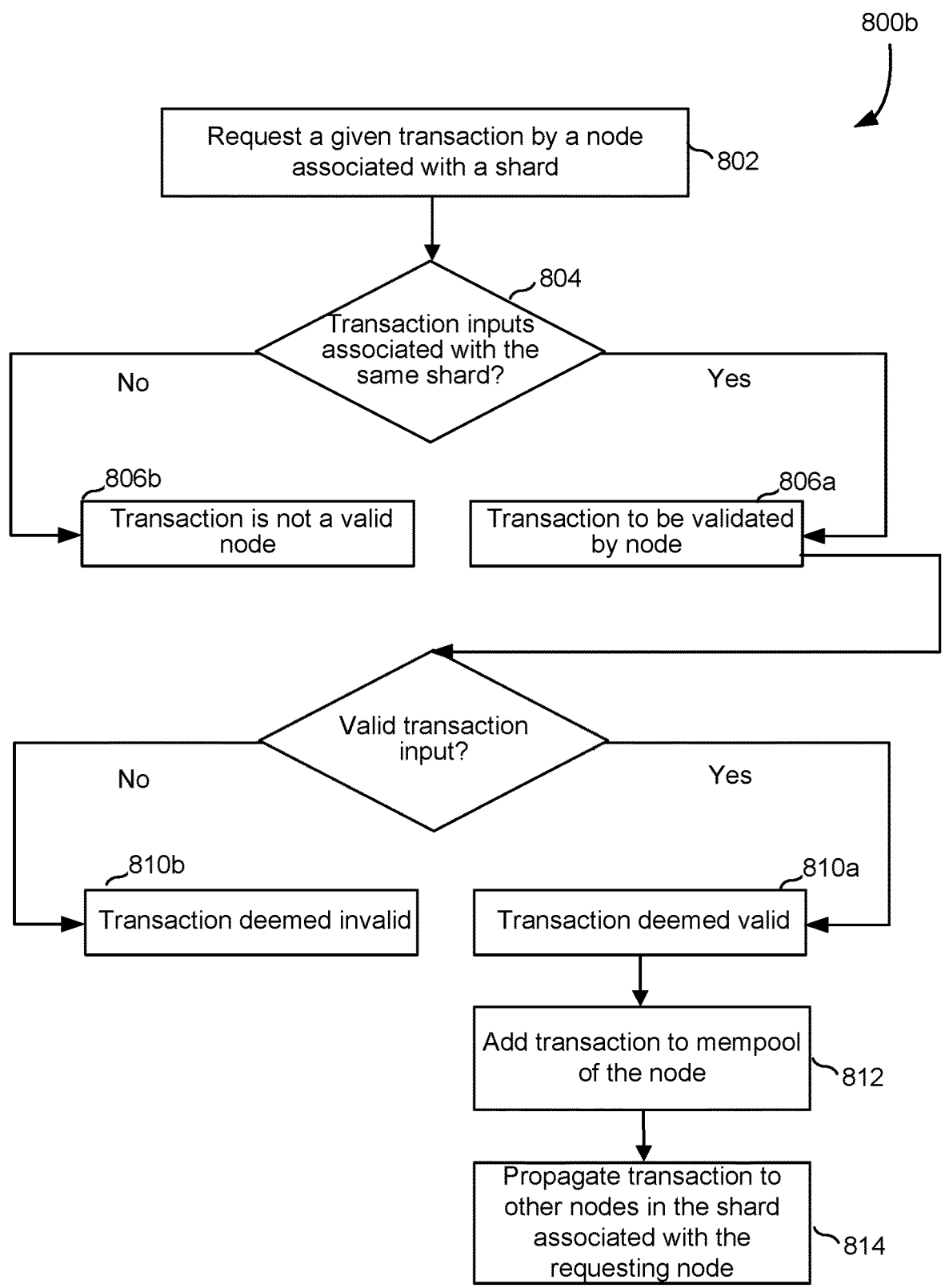

FIG. 8a illustrates an example 800a with a spending transaction (Tx) created by a node in Shard 4 being propagated to each of the shards containing the UTXOs of that transaction. In this embodiment, the node sends the transaction to both Shard 1 and 2. The process is further illustrated in FIG. 8b with method 800b.

When a node within a shard receives a given transaction in step 802, it proceed to then validate the transaction based on inputs which are within the same shard in this embodiment.

Thus, in step 804, it is checked if the given transaction's input is associated with the same shard. The transaction may be allocated to a shard as discussed above, according to the fourth embodiment. As discussed above, if the node is a member of more than one shard, then the "same" shard check in this step will apply to any of such shard.

Inputs that relate to UTXOs in a different shard are not validated, as seen in step 806b. In some implementations, the validation of each input may be carried out much in the same way as validations may be currently carried out in the Bitcoin network. Otherwise, the node proceeds to validate the transaction in step 806a.

Further to step 806a, the validity of an input associated with the given transaction is checked in step 808. As discussed above, and also in steps 706 and 708 of FIG. 7b, validation on an unspent transaction (UTXO) may be by executing its locking and unlocking scripts. In some implementations, this is referred to as the validity data for the transactions. If execution of the locking and unlocking scripts evaluate to TRUE, the transaction is valid and the transaction is written to the blockchain. Furthermore, as also discussed above, one of the validity checks is to check that there has not been a double spend. In some implementations, when a node receives a transaction, it will look up the UTXOs that the transaction spends in a data structure associated with the node, or with the shard of the node.

In the case where an input is invalid, such as when the UTXO does not exist, or the value is greater than the UTXO, or if there is a script error; then the given transaction is dropped as seen in step 810b. In this case, the given transaction is not propagated to other nodes in the same shard.

If the input is deemed valid, the transaction is identified as being valid in step 810a.

The transaction is then added to the node's mempool in step 812.

The transaction is propagated to other nodes in the shard associated with the node, in step 814.

Turning now to FIG. 9, there is provided an illustrative, simplified block diagram of a computing device 2600 that may be used to practice at least one embodiment of the present disclosure. In various embodiments, the computing device 2600 may be used to implement a node or a combination of nodes in one or more shards of the sharded blockchain network seen in FIG. 1b, and/or any of the computer implemented systems, methods or protocols illustrated and described above when taken alone or when communicatively coupled to one or more other such nodes or systems.

For example, the computing device 2600 may be configured for use as a data server, a web server, a portable computing device, a personal computer, or any electronic computing device. As shown in FIG. 9, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include random-access memory (RAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g., CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 9 is intended only as a specific example for purposes of illustrating the preferred embodiment of the device. Many other configurations having more or fewer components than the system depicted in FIG. 9 are possible.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

It is to be understood that the above description is intended to be illustrative, and not restrictive. Many other implementations will be apparent to those of skill in the art upon reading and understanding the above description. Although the disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A computer-implemented method of validating a blockchain transaction associated with a blockchain network, wherein the blockchain network is partitioned into a plurality of shards, each shard comprising at least one member node, and wherein each member node in the blockchain network is a member of at least one shard among the plurality of shards, the method comprising the steps of:

requesting, by a requesting node, at least one UTXO referenced by at least one respective input of the blockchain transaction from a member node of at least one shard comprising at least one UTXO, wherein the member node is associated with a set of UTXOs that relate to one or more transactions allocated to each shard that the member node is a member of; and based on determining that the requested at least one UTXO is available from the member node, the requesting node further performing steps of:

performing a validation check on at least one input based on validity data associated with the requested at least one UTXO;

based on determining that the blockchain transaction is valid, adding the blockchain transaction to a mempool associated with the requesting node;

propagating the blockchain transaction to other member nodes of the at least one shard that the requesting node is a member of; and communicating a request for shard membership information of a node to another node, wherein, the communication is performed using a modified addr message, and the modified addr message includes an indication of one or more of the plurality of shards that the node is associated with.

2. The computer-implemented method of claim 1, further comprising the step of:

using, by the requesting node, the shard membership information to determine whether an input of a transaction allocated to the shard is valid.

3. The method of claim 2, wherein the communication indicates a number of active nodes in a specific shard identified by the modified addr message.

4. A system for validating a blockchain transaction associated with a blockchain network, wherein the blockchain network is partitioned into a plurality of shards, each shard comprising at least one member node, and wherein each member node in the blockchain network is a member of at least one shard among the plurality of shards, the system comprising:

a processor for a requesting node in the blockchain network; and memory for a requesting node in the blockchain network, the memory including executable instructions that, as a result of execution by the processor, causes the system to perform steps of:

requesting, by a requesting node, at least one UTXO referenced by at least one respective input of the blockchain transaction from a member node of at least one shard comprising at least one UTXO, wherein the member node is associated with a set of UTXOs that relate to one or more transactions allocated to each shard that the member node is a member of; and based on determining that the requested at least one UTXO is available from the member node, further performing steps of:

performing a validation check on at least one input based on validity data associated with the requested at least one UTXO;

based on determining that the blockchain transaction is valid, adding the blockchain transaction to a mempool associated with the requesting node;

propagating the blockchain transaction to other member nodes of the at least one shard that the requesting node is a member of; and communicating a request for shard membership information of a node to another node, wherein, the communication is performed using a modified addr message, and the modified addr message includes an indication of one or more of the plurality of shards that the node is associated with.

5. A non-transitory computer-readable storage medium for validating a blockchain transaction associated with a blockchain network, wherein the blockchain network is partitioned into a plurality of shards, each shard comprising at least one member node, and wherein each member node in the blockchain network is a member of at least one shard among the plurality of shards, the non-transitory computer-readable storage medium belonging to a requesting node in the blockchain network and having stored thereon executable instructions that, as a result of being executed by a processor of a computer system, cause the computer system to at least perform steps of:

requesting at least one UTXO referenced by at least one respective input of the blockchain transaction from a member node of at least one shard comprising at least one UTXO, wherein the member node is associated with a set of UTXOs that relate to one or more transactions allocated to each shard that the member node is a member of; and based on determining that the requested at least one UTXO is available from the member node, further performing steps of:

performing a validation check on at least one input based on validity data associated with the requested at least one UTXO;

based on determining that the blockchain transaction is valid, adding the blockchain transaction to a mempool associated with the requesting node;

propagating the blockchain transaction to other member nodes of the at least one shard that the requesting node is a member of; and communicating a request for shard membership information of a node to another node, wherein, the communication is performed using a modified addr message, and the modified addr message includes an indication of one or more of the plurality of shards that the node is associated with.

* * * * *